United States Patent [19]

Potzas

[11] Patent Number: 4,541,602
[45] Date of Patent: Sep. 17, 1985

[54] PIPE CLIP
[75] Inventor: Peter Potzas, Alten-Buseck, Fed. Rep. of Germany
[73] Assignee: USM Corporation, Farmington, Conn.
[21] Appl. No.: 294,334
[22] Filed: Aug. 19, 1981
[30] Foreign Application Priority Data
  Jul. 8, 1980 [DE] Fed. Rep. of Germany ....... 3029975
[51] Int. Cl.⁴ ............................................ F16M 13/00
[52] U.S. Cl. ...................................... 248/544; 24/339; 174/166 R; 248/68.1
[58] Field of Search ...................... 248/544, 545, 68 R, 248/68 CB, 74 A, 74 R, 73, 221.4, 221.3; 24/339; 174/166 R, 157, 175, 40 CC

[56] References Cited
U.S. PATENT DOCUMENTS

| | | | |
|---|---|---|---|
| T100,605 | 5/1981 | Christian | 248/68 CB |
| 3,444,596 | 5/1969 | Soltysik | 248/73 |
| 3,856,244 | 12/1974 | Menshen | 248/68 R |
| 3,894,706 | 7/1975 | Mizusawa | 248/68 R |
| 4,358,080 | 11/1982 | Wolker | 248/68 R |

FOREIGN PATENT DOCUMENTS

| | | | |
|---|---|---|---|
| 3029975 | 4/1980 | Fed. Rep. of Germany | 248/68 R |
| 1147914 | 4/1969 | United Kingdom . | |
| 1301516 | 12/1972 | United Kingdom . | |
| 2090320 | 7/1982 | United Kingdom | 248/74 A |

Primary Examiner—William H. Schultz
Assistant Examiner—Ramon O. Ramirez
Attorney, Agent, or Firm—Aubrey C. Brine

[57] ABSTRACT

A pipe clip is provided having means for retaining the clip on a stud. Means for retaining a pipe on the clips comprises a flexible finger which embraces the pipe, and the means for retaining the clip on a stud includes a locking portion which is movable from a position allowing the finger to flex for admission of the pipe to a position in which it locks the finger in embracing engagement with the stud and firmly secures the clip to the stud.

3 Claims, 1 Drawing Figure

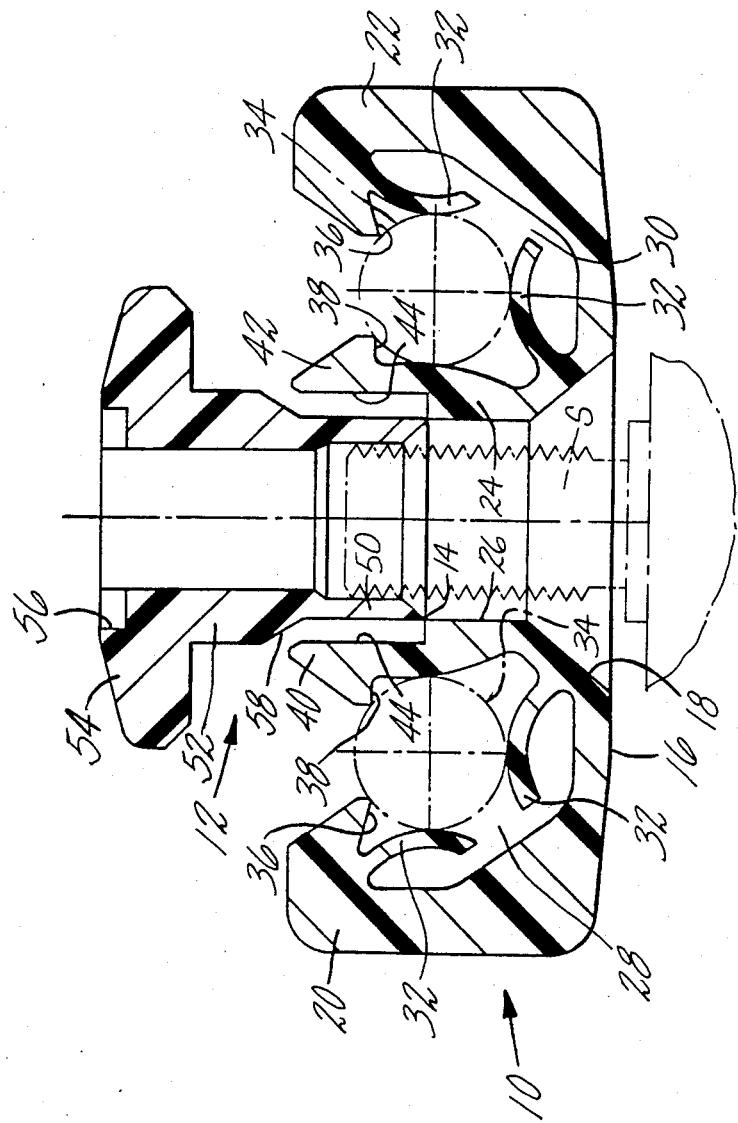

PIPE CLIP

BACKGROUND OF THE INVENTION

This invention is concerned with a pipe clip for securing a pipe in position in the locality of a screw-threaded stud or other projection comprising means for retaining the clip on the stud and means for retaining a pipe on the clip.

Pipe clips are known of a kind which is molded in one piece of plastic material and has a body portion with a bore through it of a diameter to be frictionally received over a threaded stud, the threaded stud indenting the wall of the bore to resist withdrawal of the clip, thus to provide the stud-retaining means, and which is also shaped with a part cylindrical recess of a diameter similar to the pipe and of more than 180° arc, thus to leave an opening of less than 180°, say 160°, through which the pipe can be forced so that it seats in the recess.

In using a pipe clip of the kind just referred to, it may be found that the clip, if it can sufficiently easily be pushed on the stud, may be insufficiently firmly secured to it, and that, if the walls of the recess are rigid enough to hold the pipe sufficiently firmly, excessive pressure (such as might damage the pipe) may be required to insert it. Moreover, release of a pipe held on such a clip, if it is sufficiently firmly retained, may be difficult.

It is accordingly the object of this invention to provide an improved pipe clip which facilitates assembly of the clip on the stud and of the pipe on the clip and from which the pipe can readily be released if necessary.

SUMMARY OF THE INVENTION

The foregoing object is achieved in accordance with the invention in that the pipe clip for securing a pipe in position in the locality of a screw-threaded stud or other projection comprising means for retaining the clip on the stud and means for retaining a pipe on the clip characterized in that the means for retaining a pipe on the clip includes a flexible finger which embraces a portion of the pipe and the means for retaining the clip on the stud includes a locking portion which, after the pipe has been assembled in the clip, is movable from a position in which it allows said finger to flex for admission of the pipe to the pipe-retaining means, to one in which it both locks the finger in embracing engagement with the pipe and also firmly secures the clip to the stud.

Preferably, a pipe clip in accordance with the invention is adapted to receive two pipes side-by-side, and characterized in that it has two flexible fingers as aforesaid, one to engage each pipe, which are both locked into engagement with the respective pipes when the locking portion moves into its stud-securing position.

Preferably also, the locking portion has means, e.g. a screwdriver slot or flat-sided head, to enable it to be rotated by a suitable tool to unscrew it from the threaded stud in order to release the pipe or pipes. Preferably also the clip is molded in one piece of plastic material, the locking portion being frangibly connected to the remainder of the clip.

The locking portion of a clip in accordance with the invention is preferably moved into its locking position by being driven axially along the stud towards the support from which the stud projects, and has a bore to receive the stud thread, a portion of the bore which first engages the stud being of slightly larger diameter than an adjacent portion of the bore, so that the locking portion can first be lightly held by the tip of the stud in the larger diameter portion of the bore while the pipes are assembled on the clip and then driven to its stud-retaining position forcing the smaller diameter portion of the bore over the stud. Preferably also, the locking portion has a bevelled shoulder which engages the fingers on such axial movement of the locking portion towards the support.

Preferably also, the pipe-retaining portion of a clip in accordance with the invention has, for each pipe, an arm stiffer than the finger which embraces part of the pipe in opposition to the flexible finger, and which forms with the flexible finger and the base portion of the clip a pipe-receiving recess, there being one or more resilient flaps projecting into the recess from the base and/or arm to reduce vibration to which the pipe might otherwise be subject.

BRIEF DESCRIPTION OF THE DRAWING

A pipe clip according to the invention and illustrative thereof by way of example is shown in central longitudinal section in the accompanying drawing.

DESCRIPTION OF THE PREFERRED EMBODIMENT

The illustrative pipe is adapted to receive two pipes of equal diameter, but the invention is also applicable to clips for receiving only one pipe clip or two pipes of different size. It is molded in one piece of resilient plastic material, for examle nylong or acetal resin, and comprises two parts, a body portion 10 and a locking portion 12 joined by a frangible annulus 14. The body portion 10 has a bottom face 16 to engage a support from which a threaded studs projects upwardly. The face 16 is recessed at 18 to accommodate any material around the foot of the stud (which may have a flange welded to the support).

Two relatively stiff resilient arms 20, 22 stand upwardly, one from each end of the body portion. Located centrally between the arms 20, 22 is a boss 24 with a cylindrical bore 26 of slightly larger diameter than the stud so as freely to accommodate it. Around the mouth of the bore 26 is the frangible annulus 14.

Viewed in plan (not shown) the outline of the body portion is substantially rectangular and the arms 20, 22 lie parallel to each other. Each arm 20, 22 is shaped on the inside to provide a recess 28, 30 respectively. From the walls of the recess, two resilient flaps 32 project arcuately to provide resilient support for a pipe as shown in phantom line at 34 in the drawing. The pipe 34 is retained by engagement of an inwardly projecting lip 36 on the arm at one side of the opening of the recess and the shoulder 38 on a resilient finger 40, 42 upstanding, one at each side, from the boss 24. The fingers 40, 42 are flexible, much more so than the relatively stiff arms 20, 22. With the fingers 40, 42 in their unflexed condition, the pipes 34 are retained in the recesses 28, 30 by the lips 36 of the arms 20, 22 and the shoulders 38 against the resilient flaps 32. The pipes are thus protected against undue effects of vibration. Entry of a pipe into the recess (or exit from it) is facilitated by the flexibility of the fingers 40, 42.

The locking portion 12 of the illustrative clip extends upwardly from the frangible annulus 14 which surrounds a cylindrical sleeve portion 50 of external diameter slidable in the bore 26. The internal diameter of most of the bore portion 50 is a light frictional fit on the crests on the stud thread, the entry to the bore being bevelled to facilitate initial entry of the stud thread into it. Above the sleeve portion 50 is another sleeve portion 52 of external diameter equal to the distance between flat walls 44 of the fingers 40, 42. The internal diameter of the sleeve portion 52 is such that pushed on to the stud, the crests on the studs dig into its inner wall and tend to produce a complementary threaded form on the wall itself. At its upper end, the locking portion terminates at a head 54 which may, to facilitate it being rotated as mentioned hereinafter, have an hexagonal or other non-circular periphery, or be provided with a screwdriver slot 56, as shown.

The length of the sleeve portion 50 of the illustrative clip is slightly more than that of the fingers 40, 42 so that an annular shoulder 58 between the portions 50, 52 lies just above the fingers. The shoulder 58, and the upper end of the fingers, are bevelled complementary.

The illustrative clip is such that in use it may be assembled on a welded threaded studs (for example) which is initially received and lightly held in the sleeve portion 50 of the locking portion 12, the stud being of such a length that the bottom face 16 of the clip is then close to the support. While the clip is thus supported, two pipes can be introduced to the recesses 28, 30, little resistance having to be overcome because the fingers 40, 42 yield readily until they touch and bend against the sleeve portion 50 of the locking portion, thus widening the opening to the recess sufficiently for the pipes to be admitted without damage against the albeit stiffer resistance of the resilient arms 20, 22. After the pipes engage the flaps 32, the locking portion 12 is driven towards the support either by a steady pressure or by a tap with a hammer to bring the head 56 into contact with the upper ends of the fingers 40, 42. As the sleeve portion 52 is thus forced over the screw thread, the bevelled shoulder 58 forceably separates the fingers 40, 42 causing the shoulders 38 and the inner wall of the fingers to embrace the pipes 34 and press them against the flaps 32. The pipes are now firmly retained by the relatively stiff arms 20, 22 over the outside and the fingers 40, 42, now unable to yield because they are backed up by the locking portion 12, on the inside. Movement of the locking portion 12 towards the support has thus both firmly secured the clip to the studs and locked the fingers 40, 42 in engagement with the pipes.

The pipes are thus firmly secured in place and resiliently held against the undue effects of vibration, but they can readily be released by unscrewing the locking portion 12 by means of a suitable tool, for example a screwdriver, far enough to allow the fingers 40, 42 to yield as far as the sleeve portion 50, or by removing the locking portion altogether from the studs. The clip can then, of course, be used again.

I claim:

1. A one piece molded plastic pipe clip for securing a pipe in position in the locality of a stud comprising means for retaining the clip on the stud and means for retaining a pair of pipes on the clip characterized in that said means for retaining said pipes on the clip includes a pair of flexible fingers one to embrace a portion of each pipe and said means for retaining the clip on the stud includes a locking portion frangibly connected to said clip having a beveled shoulder provided thereon and disposed adjacent said flexible finger which, after the pipe as been assembled in the clip, is movable from a position in which it allows said fingers to flex for admission of the pipes to said pipe-retaining means, to one in which it forcibly contacts said flexible fingers by engagement of said beveled shoulder with said fingers and thereby both locks said fingers in embracing engagement with the respective pipes and also firmly secures said clip to the stud, said locking portion further having a bore formed therein to receive the stud thread, a portion of said bore which first engages the stud being of slightly larger diameter than an adjacent portion of the bore, so that said locking portion can first be lightly held by the tip of the stud in said larger diameter portion of said bore while the pipe or pipes are assembled on said clip and then driven to its stud securing position forcing said bore over the stud.

2. A clip according to claim 1 further characterized in that means for rotating said locking portion is provided on said locking portion means to unscrew it from a threaded stud in order to release the pipe or pipes.

3. A clip according to claim 1 further characterized in that said pipe-retaining portion has an arm, stiffer than said finger, which embraces part of the pipe in opposition to said flexible finger and forming with said flexible finger and a base portion of the clip a pipe-receiving recess, and in that one or more resilient flaps project into said recess from said base and said arms to reduce vibration to which the pipe might otherwise by subject.

* * * * *